(12) United States Patent
Mindlin et al.

(10) Patent No.: US 11,570,568 B1
(45) Date of Patent: Jan. 31, 2023

(54) AUDIO PROCESSING METHODS AND SYSTEMS FOR A MULTIZONE AUGMENTED REALITY SPACE

(71) Applicant: Verizon Patent and Licensing Inc., Basking Ridge, NJ (US)

(72) Inventors: Samuel Charles Mindlin, Pittsburgh, PA (US); Kunal Jathal, North Hills, CA (US); Shan Anis, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 3 days.

(21) Appl. No.: 17/398,793

(22) Filed: Aug. 10, 2021

(51) Int. Cl.
*H04S 7/00* (2006.01)
*G06T 19/00* (2011.01)

(52) U.S. Cl.
CPC ............ *H04S 7/303* (2013.01); *G06T 19/006* (2013.01); *H04S 2400/01* (2013.01); *H04S 2400/11* (2013.01)

(58) Field of Classification Search
None
See application file for complete search history.

(56) References Cited

U.S. PATENT DOCUMENTS

| | | | |
|---|---|---|---|
| 2013/0236040 A1* | 9/2013 | Crawford | H04S 7/306 381/310 |
| 2017/0359467 A1* | 12/2017 | Norris | G06F 3/165 |
| 2019/0116448 A1* | 4/2019 | Schmidt | H04S 3/008 |
| 2020/0053464 A1* | 2/2020 | Peters | G06F 3/165 |
| 2020/0053505 A1* | 2/2020 | Peters | H04S 7/304 |
| 2020/0389752 A1* | 12/2020 | Aharoni | H04S 7/303 |
| 2021/0185469 A1* | 6/2021 | Izarra | G06F 3/04847 |

* cited by examiner

*Primary Examiner* — Qin Zhu

(57) ABSTRACT

An illustrative audio processing system identifies an experience location with which an augmented reality presentation device is associated. The experience location is included within a multizone augmented reality space that is presented by the augmented reality presentation device. The audio processing system determines that the experience location is within both a first sound zone and a second sound zone of the multizone augmented reality space, and, based on the determining that the experience location is within both the first and second sound zones, generates a binaural audio stream for presentation by the augmented reality presentation device. The binaural audio stream includes an environmental audio component implemented by a mix of a first environmental audio stream associated with the first sound zone and a second environmental audio stream associated with the second sound zone. Corresponding methods and systems are also disclosed.

20 Claims, 9 Drawing Sheets

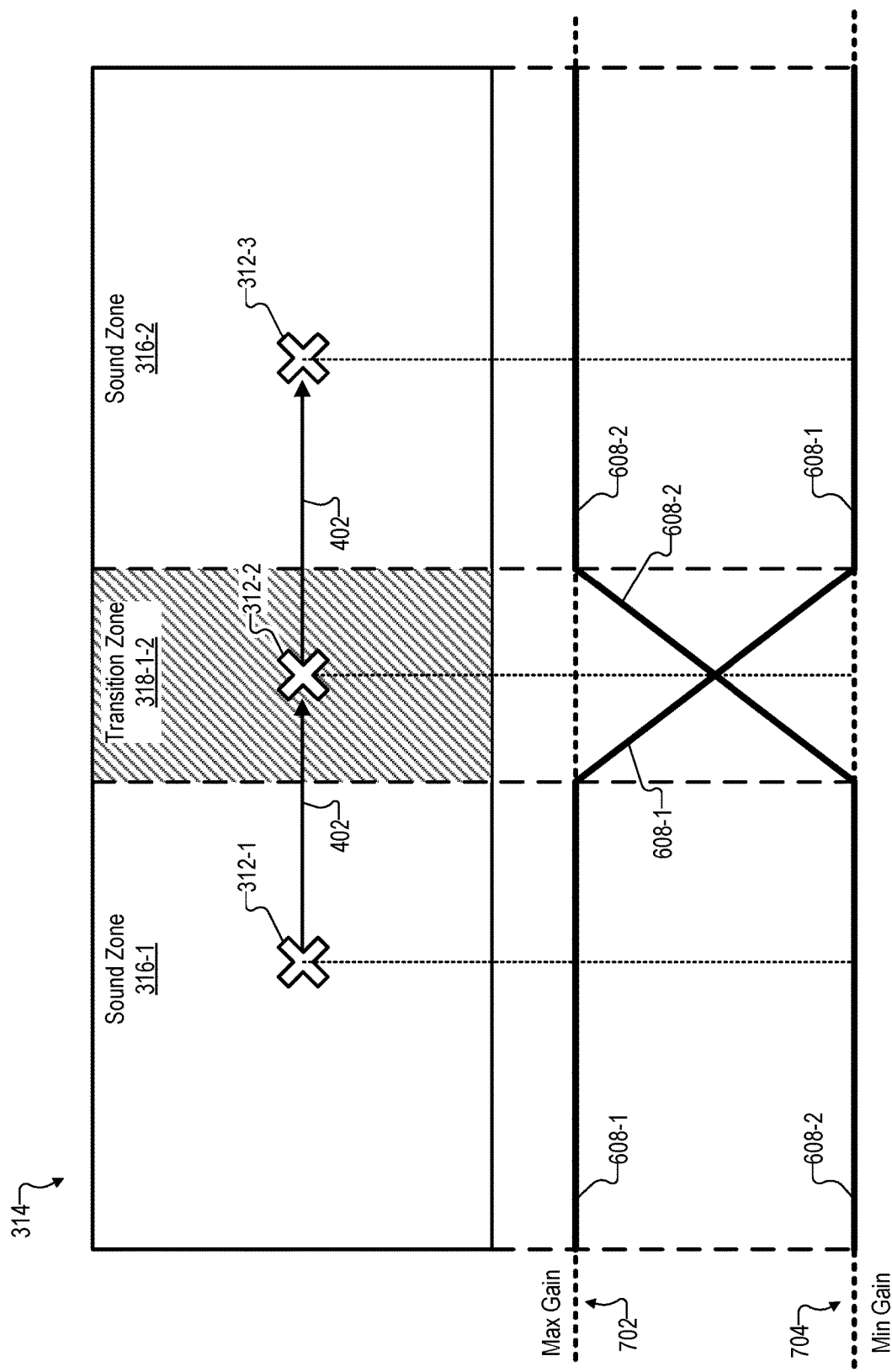

AUDIO PROCESSING METHODS AND SYSTEMS FOR A MULTIZONE AUGMENTED REALITY SPACE

BACKGROUND INFORMATION

Various types of extended reality technologies are being developed, deployed, and used by users to engage in various types of extended reality experiences. As one example, virtual reality technologies provide virtual reality experiences whereby users become fully immersed in a virtual reality world in which they can move about within virtual spaces and see, hear, and/or interact with virtual objects and/or virtual avatars of other users in ways analogous to real-world experiences. As another example, augmented reality technologies (also referred to as mixed reality technologies) provide augmented reality experiences whereby users continue to experience the real world around them to at least some extent (e.g., seeing real objects in their environment by way of a partially transparent heads-up display, video passed through from a head-mounted camera, etc.) while also being presented with virtual elements and augmentations that do not exist in the real world. For instance, virtual objects or characters may be presented as part of an augmented reality game or other entertainment application, virtual instructions or other information may be presented as part of an augmented reality educational application (e.g., an application designed to support a student in a science lab, etc.), or the like.

Certain augmented reality applications involve augmented reality spaces that may be divided into a plurality of different zones. For example, the different zones could be associated with natural divisions in the real world (e.g., different rooms or different buildings separated by physical walls and/or other real-world barriers) or with more arbitrary divisions that exist only virtually in the augmented reality space. Various challenges must be overcome to provide audio for such multizone augmented reality spaces in a manner that is immersive, accurate, and enjoyable to users.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

FIG. 7 shows illustrative gain values assigned to different environmental audio streams with respect to different experience locations within a multizone augmented reality space in accordance with principles described herein.

DETAILED DESCRIPTION OF EXAMPLE EMBODIMENTS

Figure 1:
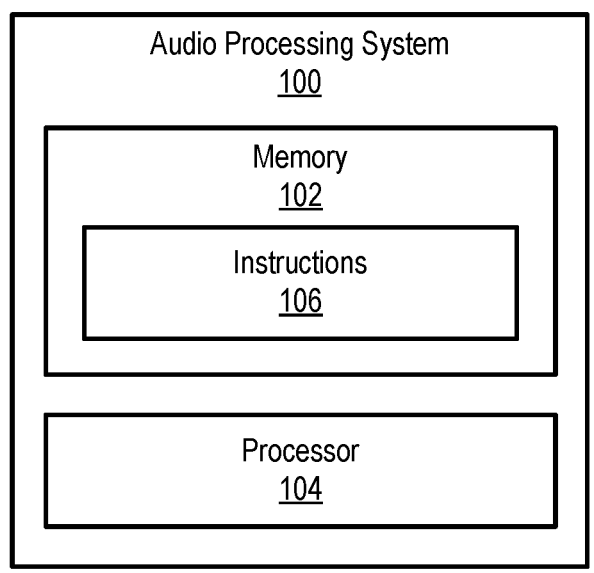
FIG. 1 shows an illustrative audio processing system configured to perform audio processing for a multizone augmented reality space in accordance with principles described herein.

Audio processing methods and systems for a multizone augmented reality space are described herein. As mentioned above, certain augmented reality applications may involve augmented reality spaces that are divided into a plurality of zones ("multizone augmented reality spaces"). For example, as will be described and illustrated in more detail below, the zones of a multizone augmented reality space may be different sound zones that correspond to different environmental audio streams (e.g., such that different ambient and/or background sounds are perceived in the different sound zones), different values of certain acoustic parameters (e.g., such that virtual sounds propagate and reverberate differently in the different sound zones), and/or other sound-related distinctions between the sound zones.

Certain sound zones included within certain multizone augmented reality spaces may correspond to physical sound barriers in the real-world environment hosting the multizone augmented reality space. For instance, if a multizone augmented reality space corresponds to a physical space that incorporates multiple rooms or structures separated by walls or other sound barriers, sound zones within this multizone augmented reality space may naturally correlate with the rooms or structures of the real-world space. In these examples, the physical sound barriers (e.g., walls, etc.) may be simulated to influence virtual propagation of virtual sounds in the multizone augmented reality space in a similar way as the barriers influence actual propagation of real-world sounds in the physical world (e.g., causing reverberations within a given room, blocking sounds from freely traveling between rooms, etc.).

As another example, sound zones included within other types of multizone augmented reality spaces may not correspond to physical sound barriers in the real-world environment. For instance, certain multizone augmented reality spaces may correspond to physical models (e.g., artificial miniaturized representations) of real-world scenes that may include multiple zones that are to be associated with different sounds and acoustic properties even though the zones are too small or uniform to be associated with real-world differences in sounds and acoustics. As one example, a tabletop model of a village and associated landscape may be employed as a stage for certain augmented reality experiences. For instance, different structures and parts of the model (e.g., a castle courtyard, a village square, a blacksmith shop, an enchanted forest, etc.) may be virtually associated with different sounds and acoustics even though physical sounds and acoustics across the real-world tabletop model may be essentially uniform. As another example, a model train set contained within a single real-world room may be set up to wind through various different landscapes and climates (e.g., a snowy mountain pass, a jungle landscape, a waterfront area, a busy cityscape, etc.) that likewise may each be associated with different virtual sounds and acoustics even though the physical sounds and acoustics throughout the room containing the model train setup may be essentially uniform. In these examples, sound barriers between different sound zones (e.g., between the castle courtyard and the enchanted forest in the model village example, between the jungle and the city in the model train example, etc.) may be simulated despite an absence of actual physical sound barriers separating the sound zones.

As will be described in more detail below, the sound zones simulated for both of these types of examples (e.g., the larger examples with corresponding physical barriers or the smaller examples without corresponding physical barriers) may be associated both with particular sounds (e.g., particular environmental sounds, etc.) and with particular acoustic properties.

The particular sounds may include environmental sounds (e.g., ambient sounds, background sounds, etc.) associated with the sound zones and not necessarily originating from any discernible sound source. For instance, the sound of a river running, traffic noise, animal sounds (e.g., birds singing, crickets chirping, etc.), and other such environmental sounds may be associated with a particular sound zone and may be heard by anyone experiencing augmented reality within that sound zone. Certain sounds originating from discernible sources ("sourced sounds") may also be heard within a sound zone if the sound source (e.g., a character speaking, etc.) is either located within the sound zone or located relatively near the sound zone and originating sound at a sufficient volume to carry into the sound zone.

The acoustic properties of a sound zone may relate to reverberation properties of the sound zone (e.g., the size of the room if indoors, the presence of objects that would provide an echo if outdoors, etc.) and/or other acoustic properties (e.g., sound decay times, echo times, diffusion properties, density properties, gain properties, etc.). As such, when a user moves from experiencing one sound zone to another, not only may the actual sounds change, but the way that different types of sounds (e.g., environmental and sourced sounds) propagate, reverberate, and are perceived may also change. Accordingly, audio processing (e.g., involving both sounds and acoustic properties) may be performed so as to customize an audio stream for a particular device or user based on the virtual or actual location of the device or user with respect to the sound zones and/or sound sources of the multizone augmented reality space.

In situations when the virtual or actual location of the device or user (the "experience location") is in an overlapping portion of two different sound zones (e.g., an area treated as a transition zone between different sound zones), aspects of the sounds and/or acoustics of both sound zones may be provided to the device for the user to perceive. For instance, as will be described in more detail below, the user may be presented with a binaural audio stream that includes a mix of two or more different environmental audio streams associated with the different sound zones and propagation of sourced sounds may be based on acoustic parameters that are interpolated based on the parameters assigned to the different sound zones. As a result, a user moving from zone to zone within a multizone augmented reality space may enjoy seamless transitions of environmental sounds and acoustics throughout the space. In these ways and other ways that will be described, audio processing systems and methods described herein may help provide high-quality and immersive audio experiences for users of multizone augmented reality spaces regardless of where the users choose to go within a given space and regardless of how many sound zones may be included in the space or the complexity of sounds within a given sound zone.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for environmental audio processing for a multizone augmented reality space may provide any of the benefits mentioned above, as well as various additional and/or alternative benefits that will be described and/or made apparent below.

FIG. 1 shows an illustrative audio processing system 100 configured to perform audio processing for a multizone augmented reality space in accordance with principles described herein. System 100 may be implemented by computer resources such as processors, memory facilities, storage facilities, communication interfaces, and so forth. In some examples, system 100 may be partially or fully implemented by user equipment (UE) devices such as augmented reality presentation devices (e.g., hand-held devices, head-mounted devices, etc.), mobile devices (e.g., smartphones, tablet devices, etc.), personal computers, or other equipment used directly by end users. Additionally or alternatively, system 100 may be partially or fully implemented by computing systems that are located remotely from users and/or accessed by a plurality of UE devices, such as distributed computing systems operated by a cellular data provider (e.g., multi-access edge compute (MEC) systems), distributed computing systems operated by a cloud-computing provider (e.g., multi-access cloud compute systems), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with audio processing for a multizone augmented reality space as described herein and/or as may serve a particular implementation.

Figure 2:
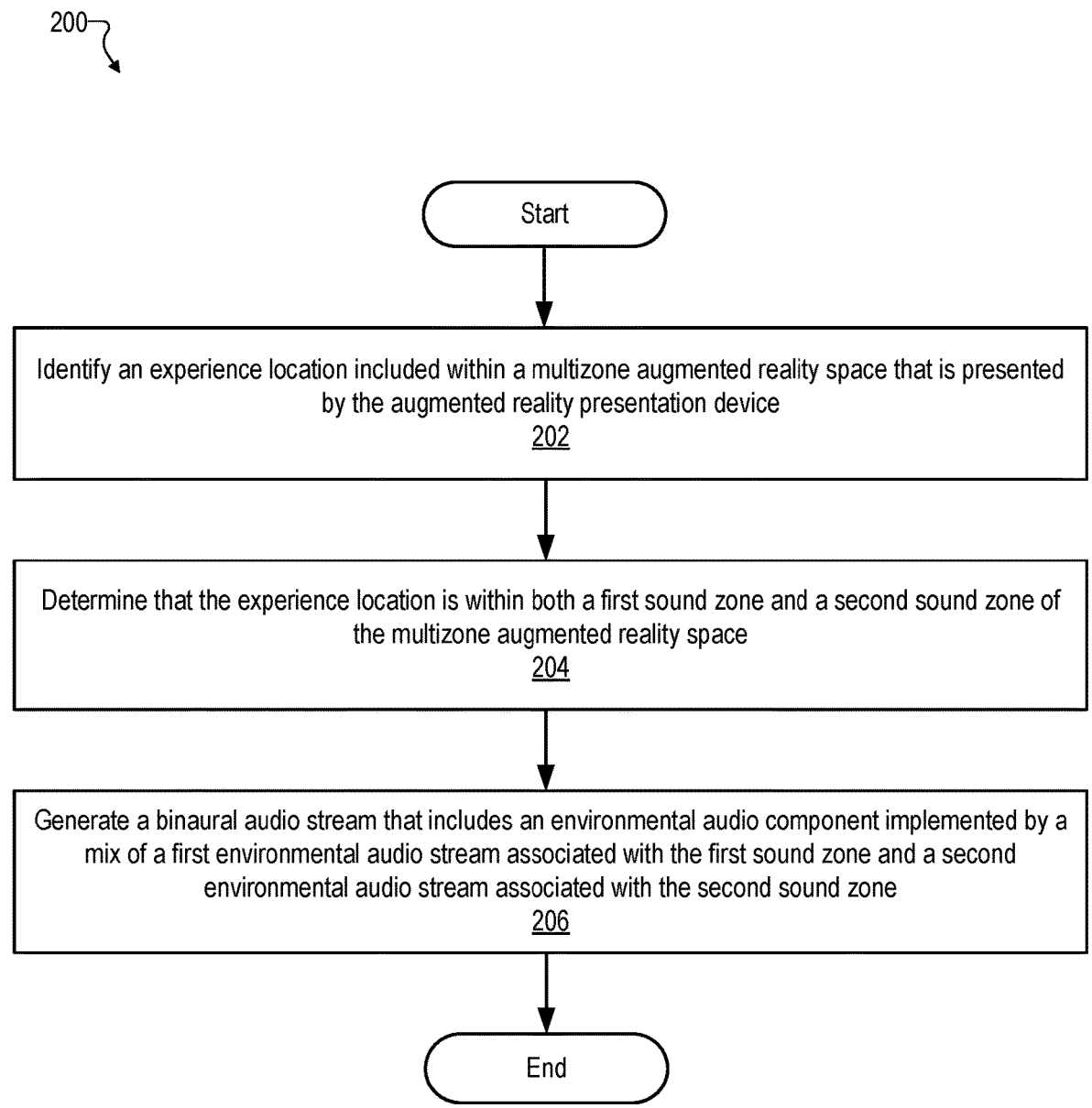
FIG. 2 shows an illustrative audio processing method for a multizone augmented reality space in accordance with principles described herein.

As one example of functionality that processor 104 may perform, FIG. 2 shows an illustrative audio processing method 200 for a multizone augmented reality space in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an audio processing system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by system 100 (e.g., by processor 104 as processor 104 executes instructions 106 stored in memory 102).

At operation 202, system 100 may identify an experience location with which an augmented reality presentation device is associated. The experience location may be included within a multizone augmented reality space that is presented by the augmented reality presentation device. For example, the experience location may be a location of the augmented reality presentation device itself in a case where the multizone augmented reality space is relatively large (e.g., including multiple rooms or structures such as with certain examples described above). As another example, the experience location may be a location depicted by a field of view of the augmented reality presentation device (e.g., a location toward which a camera of the augmented reality presentation device is pointed, etc.) in a case where the multizone augmented reality space is relatively small (e.g., contained on a tabletop or within a single room such as with other examples described above). In either case, the identified experience location may represent a location within the multizone augmented reality space from which a user is experiencing the multizone augmented reality space, particularly with respect to the audio being presented to the user. As such, and as described in more detail below, the experience location may be used to determine which environmental sounds the user is to be presented, which acoustic properties should be used to process environmental sounds and/or sourced sounds, and so forth.

Based on the experience location identified at operation 202, system 100 may identify a sound zone (or multiple sound zones) of the multizone augmented reality space in which the experience location is located. For instance, as indicated in the specific example of operation 204, system 100 may determine that the experience location identified in operation 202 is within both a first sound zone and a second sound zone of the multizone augmented reality space. In other words, in this example the first and second sound zones are overlapping to at least some extent and the experience location is determined to be in the overlapping region (also referred to herein as a "transition zone") that is between the sound zones and considered to be part of both sound zones.

At operation 206, system 100 may generate a binaural audio stream for presentation to a listener by the augmented reality presentation device. For example, the binaural audio stream may be rendered based on a three-dimensional (3D) audio stream such as an Ambisonic or multi-channel audio stream configured to represent sound in a manner configured to provide the listener (e.g., a user to whom the binaural audio stream is presented) a greater sense of depth, as well as to allow the listener to localize the sound in a 3D sound space, rather than merely in a 2D sound plane.

In the example of method 200, the binaural audio stream generated at operation 206 may be based on the determining, at operation 204, that the experience location is within both the first and second sound zones. Specifically, for instance, the binaural audio stream may be generated to include an environmental audio component that is implemented by a mix of a first environmental audio stream associated with the first sound zone and a second environmental audio stream associated with the second sound zone. In other examples, such an environmental audio component may be included, but the component may be implemented by just one environmental audio stream associated with a particular sound zone, by a mix of two different environmental audio streams, by a mix of more than two environmental audio streams, or by another suitable combination. Additionally, system 100 may further generate the binaural audio stream at operation 206 to include other components (e.g., along with the environmental audio component) such as sourced audio components or the like. Various principles associated with operations 202-206, as well as operations similar and/or related to (e.g., building on) operations 202-206, will now be described in more detail.

Figure 3:
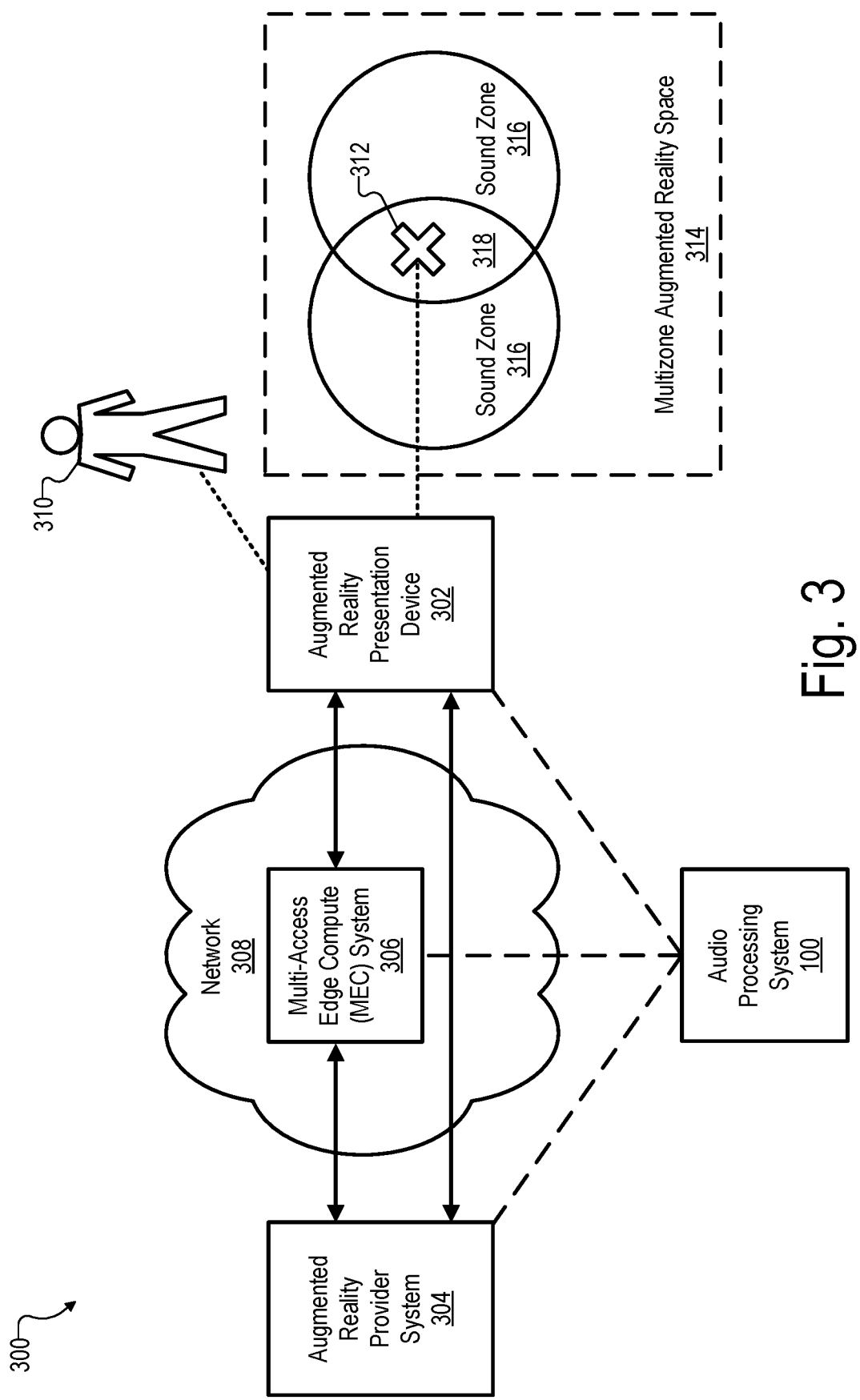
FIG. 3 shows an illustrative configuration in which the audio processing system of FIG. 1 may operate in accordance with principles described herein.

FIG. 3 shows an illustrative configuration 300 in which system 100 may operate in accordance with principles described herein. Specifically, as illustrated by dotted lines connected to system 100 at the bottom of the figure, system 100 may be implemented by one or more of an augmented reality presentation device 302 ("device 302"), an augmented reality provider system 304, a multi-access edge compute (MEC) system 306, and/or any other suitable device or system as may serve a particular implementation. For instance, certain implementations of system 100 may be implemented exclusively by one of these devices or systems such that the device or system performs method 200 while in communication with the other devices and/or systems. Other implementations of system 100 may be implemented by a combination of these devices and/or systems such that different devices and/or systems perform different parts of method 200 while communicatively coupled to the other devices and/or systems.

As shown, augmented reality provider system 304 may be a server-side system communicatively coupled to device 302 by way of a network 308 while device 302 presents an augmented reality experience to a user 310. Augmented reality provider system 304 may provide data used by device 302 to present an augmented reality experience. For instance, augmented reality provider system 304 may provide graphics and/or audio data representative of augmentations or other virtual elements that are to be displayed as part of the augmented reality experience, as well as metadata associated with these virtual elements (e.g., indications of real-world objects the augmentations are to be associated with, where the augmentations are to be displayed, how the augmentations are to be customized to particular objects or particular rooms, etc.). In some examples, augmented reality provider system 304 may be implemented by a cloud-based multi-access server that provides service not only for device 302 but also for other augmented reality presentation devices providing augmented reality experiences to other users.

Network 308 may include any network or networks configured to transport data between endpoints such as device 302, augmented reality provider system 304, and/or other devices or systems in a particular implementation. In some examples, network 308 may include or be associated with a local area network, a wide area network, or the Internet. Additionally, network 308 may include a provider network such as a cellular data network (e.g., a 5G network or data network of another suitable generation) that is managed by a service provider such as a telecommunications service provider (e.g., a cellular service provider), an application service provider, a storage service provider, an internet service provider, or the like.

In certain examples, MEC system 306 may be implemented within network 308. For example, MEC system 306 may be implemented on the edge of the provider network within a network element such as a radio access network, a transport access point, a service access point, or another such element of the provider network. While a cloud-based augmented reality provider system 304 may take advantage of certain economies of scale (along with associated efficiencies and other advantages associated therewith) that may not be available for MEC system 306, MEC system 306 may be configured to provide more responsive computational support to device 302. For example, latencies of tasks performed by MEC system 306 may be significantly lower than latencies of tasks performed by augmented reality provider system 304. As such, device 302 may be used in connection with either of augmented reality provider system 304 or MEC system 306 to implement system 100 and/or otherwise support the presentation of the augmented reality experience to user 310. In certain examples, device 302 may be used together with both augmented reality provider system 304 and MEC system 306 to perform different types of tasks (e.g., tasks prioritizing processing efficiencies, tasks prioritizing low-latency responsiveness, etc.) as may serve a particular implementation. In still other implementations, device 302 may be configured to implement system 100 and perform all of the operations associated with method 200 and presenting the augmented reality experience without reliance on an external system such as augmented reality provider system 304 or MEC system 306.

Device 302 may be implemented as any suitable computing device configured to present an augmented reality experience in any way as may serve a particular implementation. For instance, device 302 may be implemented by a general-purpose mobile device such as a smartphone or tablet device in certain examples, by a special-purpose extended reality presentation device (e.g., a head-mounted augmented or virtual reality device, etc.) in other examples, or another type of device (e.g., a laptop or desktop computer, etc.) in still other examples.

As shown, device 302 may be used by user 310 to experience, from an experience location 312 that user 310 may control, a multizone augmented reality space 314. As has been mentioned, and as will be described and illustrated in more detail below, a multizone augmented reality space such as multizone augmented reality space 314 may be associated with a real-world space that is relatively large (e.g., including multiple room or structures in certain examples) or relatively small (e.g., limited to a model contained on a tabletop or within a single room, etc.).

Multizone augmented reality space 314 may include a plurality of sound zones 316 (two examples of which are shown in FIG. 3). Sound zones 316 may serve as environmental sound zones (e.g., zones with which particular environmental audio streams are associated), acoustic simulation zones (e.g., reverberation zones or other such zones within which particular acoustic parameter values are designated to dictate certain ways in which virtual sound is simulated to virtually propagate), another type of sound zone, or a combination of any of these. In examples described below, for instance, sound zones 316 will be understood to serve as both environmental sound zones and acoustic simulation zones. However, it will be understood that, in certain implementations, environmental sound zones and acoustic simulation zones may not be coincident with one another but, rather, may be geometrically independent as may serve a particular implementation.

As shown in FIG. 3, certain sound zones 316 may overlap one another to form transition regions that are included in both sound zones. For example, FIG. 3 is shown to include a transition zone 318 that is made up of overlapping regions of two sound zones 316 and that is shown to contain experience location 312 (represented using an 'X') at the moment depicted in FIG. 3. In certain implementations, a transition zone 318 sandwiched between two different sound zones 316 may be considered to be a separate zone that is not part of either sound zone 316 (as opposed to being included within both sound zones 316). It will be understood, however, that this distinction is largely a semantic one, and that any transition zone 318 incorporating properties of two or more sound zones 316 may be considered, for purposes of the principles described herein, to be part of both sound zones 316 as a transition zone 318.

Figure 4:
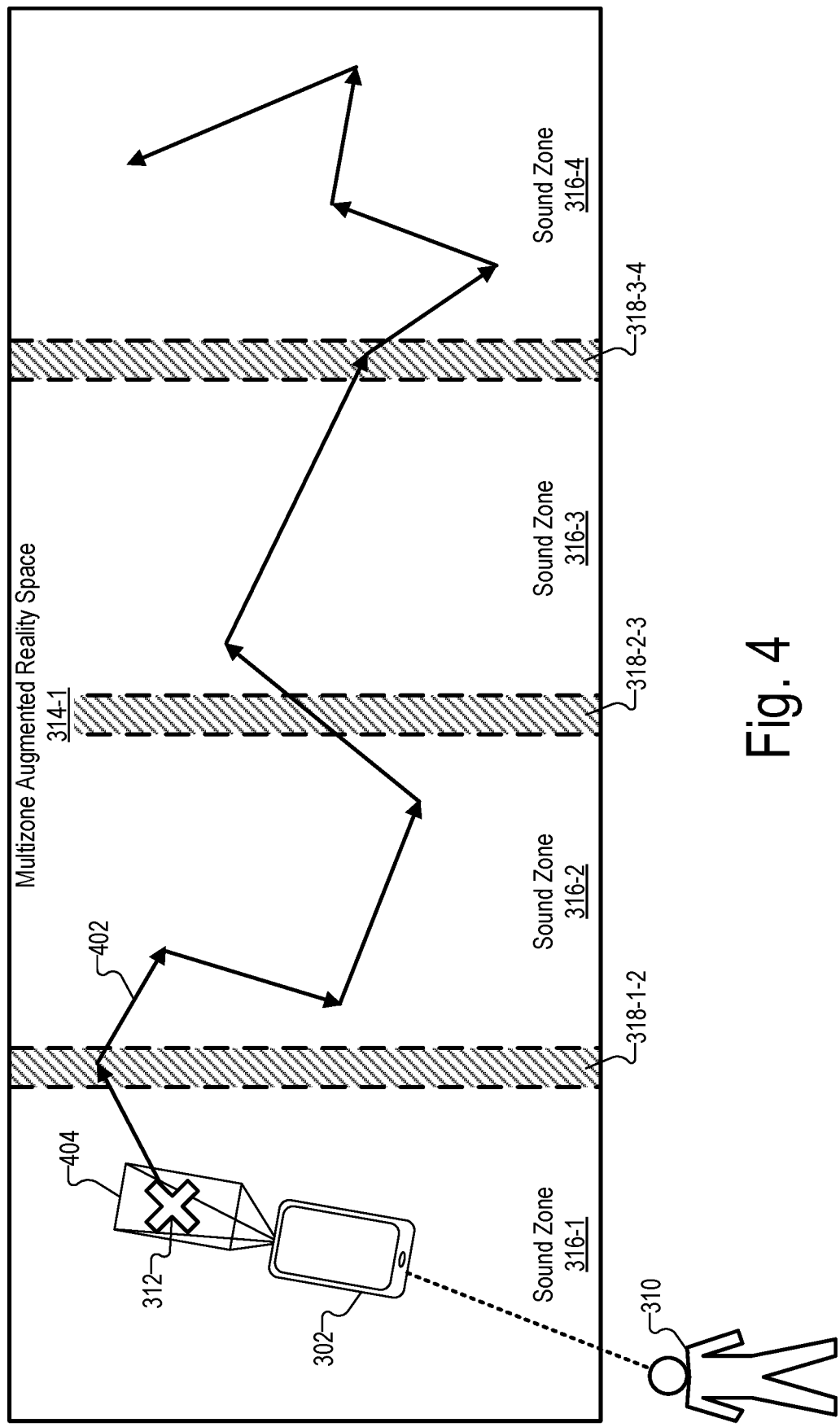
FIGS. 4-5 show illustrative movements, through zones of illustrative multizone augmented reality spaces, of an experience location with which an augmented reality presentation device is associated in accordance with principles described herein.
Figure 5:
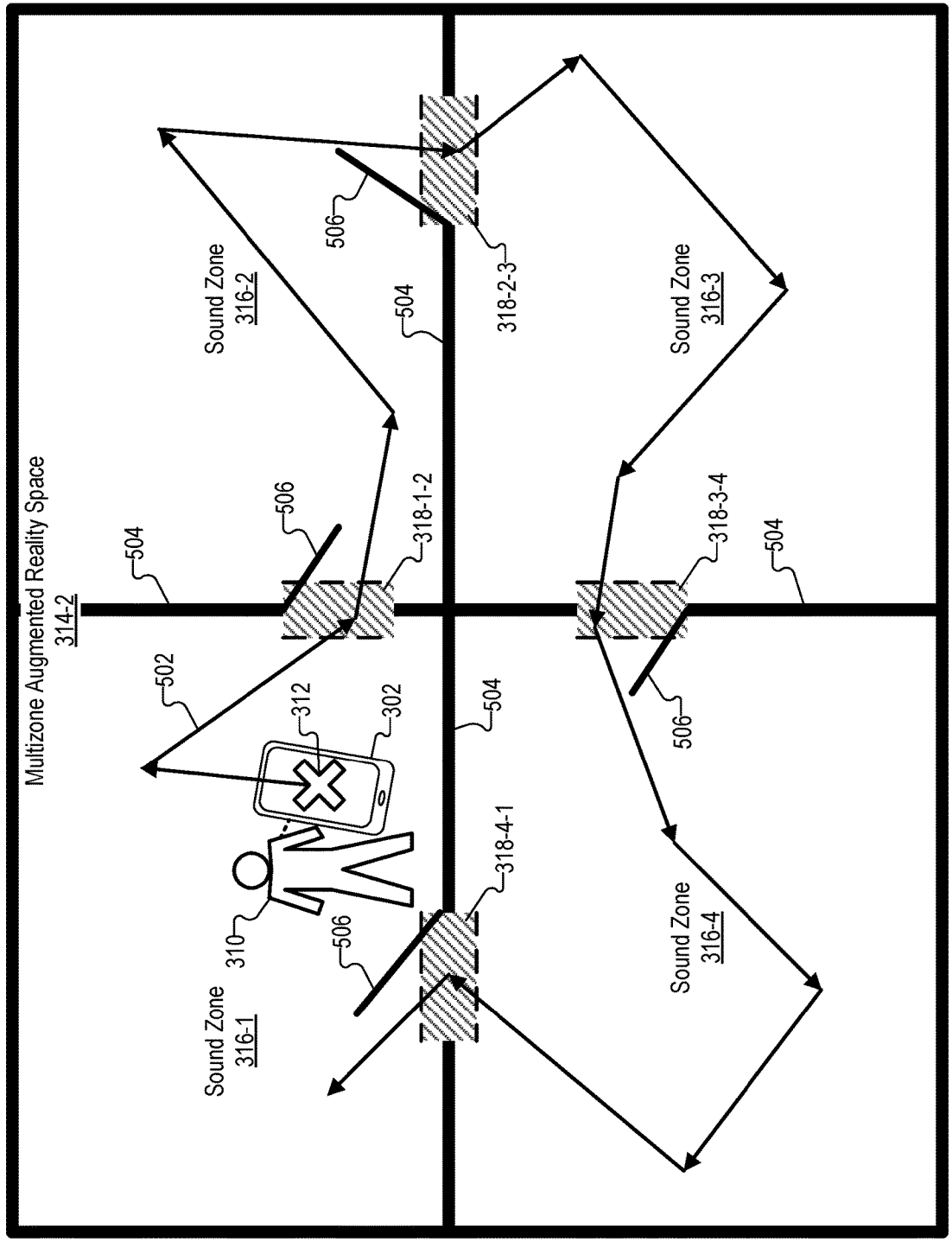

To illustrate different types of multizone augmented reality spaces that may be experienced in different ways, FIGS. 4 and 5 show illustrative movements of experience location 312 through illustrative sound zones 316 of different types of multizone augmented reality spaces 314. More particularly, FIG. 4 shows an example of a relatively small multizone augmented reality space 314-1 that will be understood to be contained within a single room (e.g., being implemented by a physical model or miniaturized representation of a real-world scene such as a tabletop village model, a model train set, etc.), while FIG. 5 shows an example of a relatively large multizone augmented reality space 314-2 that will be understood to extend over multiple rooms within one or more structures (e.g., rooms of an office or home, etc.).

In both multizone augmented reality spaces 314-1 (in FIG. 4) and 314-2 (in FIG. 5), illustrative sound zones 316 are numbered from 1-4 for convenience in referring to individual sound zones. This numbering will be understood to be a consequence of the fact that each of multizone augmented reality spaces 314-1 and 314-2 happen to have four zones, though it will be understood that other multizone augmented reality spaces may have more or fewer than four sound zones. Additionally, a numbering convention is used for transition zones 318 in both multizone augmented reality spaces 314-1 and 314-2. Specifically, each transition zone 318 is numbered to identify both sound zones that overlap to form it (i.e., the sound zones that the transition zone is located between). For instance, as shown, a transition zone 318-1-2 is formed from overlapping regions of sound zones 316-1 and 316-2, a transition zone 318-2-3 is formed from overlapping regions of sound zones 316-2 and 316-3, and so forth.

In the example of FIG. 4, user 310 is shown to be located outside of multizone augmented reality space 314-1 (e.g., standing over or next to the physical model of the miniaturized scene, etc.). From this position, user 310 may move experience location 312 along a path 402 (illustrated by various arrows representing different movements of the experience location) by aiming device 302 at different points within multizone augmented reality space 314-1. In this example, the experience location 312 with which device 302 is associated is shown to be a location, within multizone augmented reality space 314-1, that is displayed within a field of view 404 presented by device 302. As such, user 310 may control experience location 312 by holding device 302 over different locations on multizone augmented reality space 314-1 and/or pointing device 302 in different directions to thereby cause different parts of multizone augmented reality space 314-1 to be displayed within field of view 404. For example, as shown in the example of FIG. 4, user 310 may begin by pointing device 302 to a location within sound zone 316-1 (where experience location 312 is shown) and may then move experience location 312 to transition zone 318-1-2, to several points within sound zone 316-2, past transition zone 318-2-3 to a location in sound zone 316-3, into transition zone 318-3-4, and from there into several different locations within sound zone 316-4.

As mentioned above, transition zones 318 included in multizone augmented reality space 314-1 may be artificially designated rather than, for example, corresponding to actual physical barriers (e.g., walls, etc.) that would influence real-world sound propagation enough to create natural sound zones. For example, multizone augmented reality space 314-1 could be implemented as a tabletop model used for an augmented reality adventure game and each sound zone 316 may be associated with a different part of an imaginary world (e.g., having a different climate, different types of structures and/or characters, etc.). As the user moves from location to location within multizone augmented reality space 314-1 (e.g., to solve various puzzles, to virtually interact with various characters and/or virtual phenomena, and/or to otherwise advance according to the objectives of the game), system 100 may cause sound to be presented to the user 310 that is appropriate for the part of the space in which user 310 has currently positioned his or her experience location 312.

In the example of FIG. 5, user 310 is shown to be located inside multizone augmented reality space 314-2 and to be carrying device 302 so as to move experience location 312 along a path 502 (again illustrated by various arrows representing different movements of the experience location) by moving with device 302 from room to room within multizone augmented reality space 314-2. In this example, the experience location 312 with which device 302 is associated is shown to be a location of device 302 itself within multizone augmented reality space 314-2 (which may be the same, similar, or completely different from a location displayed within the field of view of device 302). As such, user 310 may control experience location 312 by moving with device 302 from room to room (i.e., from sound zone 316 to sound zone 316 in this example) within multizone augmented reality space 314-2. For example, as shown in the example of FIG. 5, user 310 may start in sound zone 316-1 (where experience location 312 is shown) and may then move with device 302 (thereby moving experience location 312) to another location within sound zone 316-1, to transition zone 318-1-2 in a doorway between sound zones 316-1 and 316-2, to several locations within sound 316-2 and to transition zone 318-2-3, and so forth until arriving back in sound zone 316-1 at the end of path 502.

In contrast with the example of multizone augmented reality space 314-1, transition zones 318 included in multizone augmented reality space 314-2 may coincide with natural transition zones between real-world sound zones created by physical barriers such as walls 504, doors 506, and the like. For example, multizone augmented reality space 314-2 could be implemented within an office, home, or other structure, and each sound zone 316 may be associated with a different room within the structure (e.g., an office, a hallway, a break room, etc.). As the user moves from location to location within multizone augmented reality space 314-2 (e.g., to view different augmentations that may be presented in different parts of the structure, etc.), system 100 may cause sound to be presented to the user 310 that is appropriate for the room in which user 310 has currently placed his or her experience location 312 and virtual sound (e.g., environmental sound, sourced sound virtually propagating through the space, etc.) may be perceived as being affected by walls 504, doors 506, and so forth.

For various experience locations selected by user 310 within a multizone augmented reality space (e.g., by moving according to path 402 in multizone augmented reality space 314-1 or path 502 in multizone augmented reality space 314-2), system 100 may continuously generate a binaural audio stream configured to allow user 310 to hear various different sounds appropriate for the dynamic experience location moving along the path.

For example, at one point in time, it may be desirable for the user to be presented an environmental audio stream associated with the sound zone in which the experience location is currently located (e.g., an environmental audio stream for sound zone 316-1 when experience location 312 is in sound zone 316-1, an environmental audio stream for sound zone 316-2 when experience location 312 is in sound zone 316-2, a mix of environmental audio streams for sound zones 316-1 and 316-2 when experience location 312 is in transition zone 318-1-2, etc.). By being presented one or more environmental audio streams in this way, the augmented reality experience enjoyed by user 310 may be made more immersive since user 310 may hear background and ambient sounds appropriate for the particular part of the multizone augmented reality space he or she is experiencing. For instance, the crackling of a fire and rain pattering on the roof may make a cozy indoor scene more immersive, the sound of wind rustling through leaves and a river flowing in the distance may be used for a mountain meadow scene, and the sounds of voices and traffic (car horns honking, etc.) may be most appropriate for a scene in a busy city.

Along with such environmental sounds originating from sound sources that are not necessarily discernible by the user, a given augmented reality experience may also involve various additional sounds that originate from sources that can be seen. For example, audio from characters speaking in the environment and various other things making sounds during an augmented reality experience may be mixed together with an environmental audio component to generate the overall binaural audio stream presented to the user. As a general example, a sound source present within a multizone augmented reality space 314 may originate a virtual sound. System 100 may then simulate, within the multizone augmented reality space 314, virtual propagation of the virtual sound from the sound source to the experience location. System 100 may also generate the binaural audio stream to further include, mixed with the environmental audio component and based on the simulating of the virtual propagation, a sourced audio component representing the virtual sound.

Figure 6B:
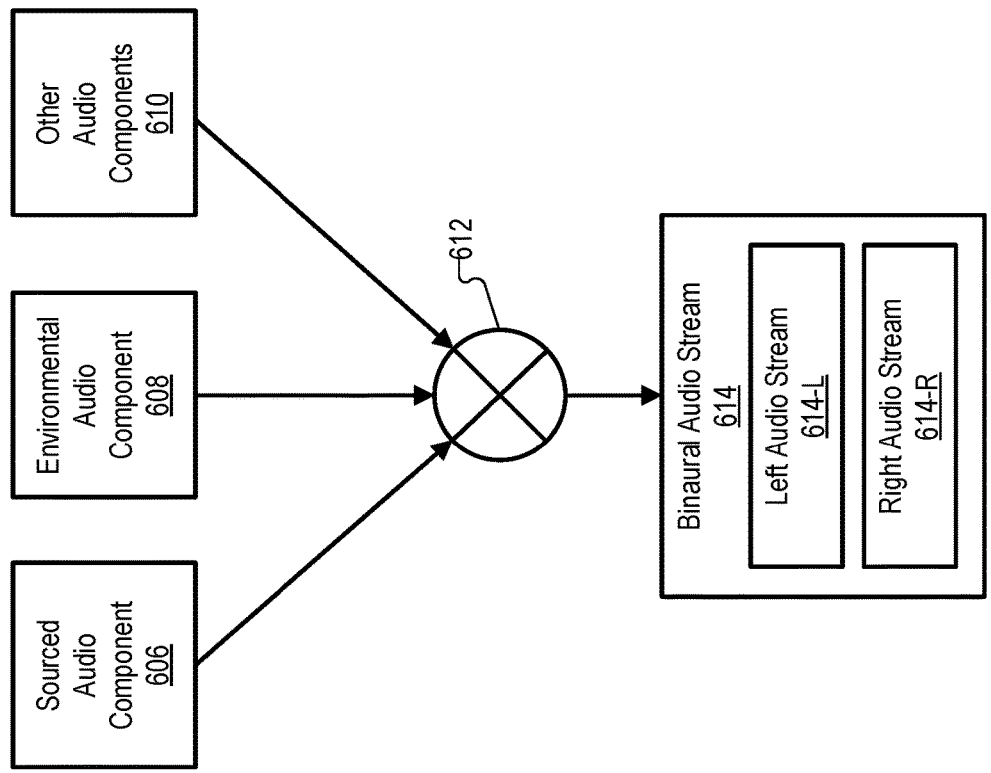
FIG. 6B shows an illustrative mixing of audio components to form a binaural audio stream in accordance with principles described herein.
Figure 6A:
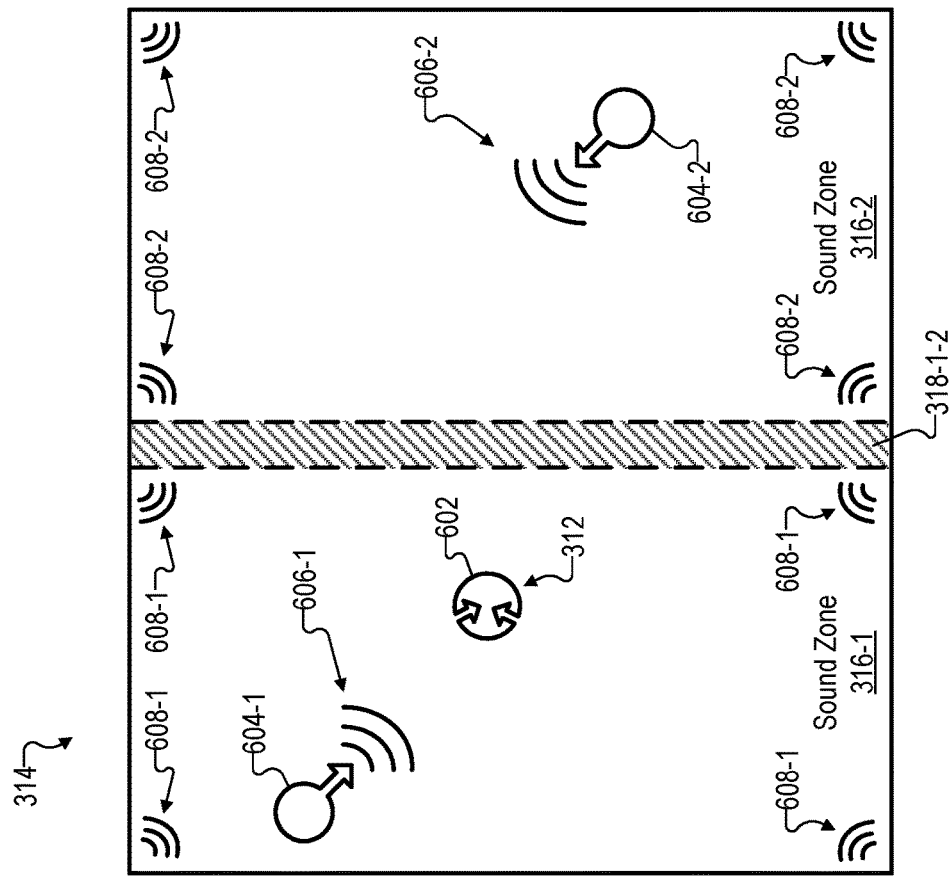
FIG. 6A shows illustrative virtual propagation of environmental and sourced sounds within an illustrative multizone augmented reality space in accordance with principles described herein.

To illustrate, FIG. 6A shows illustrative virtual propagation of environmental and sourced sounds within an illustrative implementation of multizone augmented reality space 314, while FIG. 6B shows an illustrative mixing of different audio components to form an example binaural audio stream that system 100 may provide for presentation to user 310.

In FIG. 6A, a symbol 602 is shown to be located at experience location 312 within a sound zone 316-1 of multizone augmented reality space 314. Symbol 602 is shown to have two inward-pointing arrows representative of how sound may be received by two ears of an avatar (e.g., a visible avatar displayed in the space or a virtual avatar that is not displayed but nonetheless represents the user within multizone augmented reality space 314) located at experience location 312. System 100 may receive and track a pose matrix for this avatar that represents not only the location of the avatar symbolized by symbol 602 (i.e., experience location 312), but also an orientation of the avatar (i.e., which direction the avatar is facing with respect to the world). As such, system 100 may customize a binaural audio stream for the specific pose (e.g., experience location and orientation) of the avatar as user 310 dynamically moves and turns the avatar by moving and/or reorienting device 302.

Also shown in FIG. 6A are symbols 604 (e.g., symbol 604-1 located near experience location 312 in sound zone 316-1 and symbol 604-2 located in sound zone 316-2) that represent sound sources from which sourced sounds 606 originate (e.g., sourced sound 606-1 originating from symbol 604-1 and sourced sound 606-2 originating from symbol 604-2). In contrast to the inward-pointing arrows of symbol 602 (representing receiving or hearing sound), symbols 604 are shown to include an outward-pointing arrow representing sound that is originated at the symbol (e.g., by a character speaking, etc.). For example, sound 606-1 is shown to originate at the location of symbol 604-1 in sound zone 316-1 and sound 606-2 is shown to originate at the location of symbol 604-2 in sound zone 316-2. FIG. 6A shows examples of sourced sounds that may be originated and configured to propagate only in one sound zone 316 (including within any transition zones 318 that are part of that sound zone 316). Accordingly, for example, while the sound 606-1 originating at the sound source of symbol 604-1 may virtually propagate through sound zone 316-1 to be heard by a user whose avatar is located at experience location 312 (i.e., at the location and orientation of symbol 602), the sound 606-2 originating at the sound source of symbol 604-2 may be limited to virtual propagation within sound zone 316-2, and hence may neither be received by the avatar at the experience location 312 in sound zone 316-1 nor included in the binaural audio stream presented to the user represented by that avatar.

While not explicitly shown in FIG. 6A, it will be understood that certain sound sources may extend across multiple sound zones 316 and/or make sounds that may propagate into or through multiple sound zones 316. For example, a train may travel through multiple sound zones and may serve as an example of a sound source that generates sounds that propagate through each of several sound zones. Accordingly, in these examples, users having experience locations in different sound zones may each hear certain sourced sounds (e.g., the train) while also hearing localized sourced sounds (e.g., characters speaking quietly enough that their voices do not carry into other sound zones) that are unique to their sound zones.

Along with sourced sounds 606, FIG. 6A also shows environmental sounds 608 that are associated with each sound zone 316. Specifically, an environmental sound 608-1 associated with sound zone 316-1 and an environmental sound 608-2 associated with sound zone 316-2 are both shown to be originating from undiscernible sources at the edges or corners of their respective sound zones 316. Environmental sounds may be directional such that, for example, a birdsong may be perceived as coming from one direction while a stream flowing may be perceived as coming from another direction. However, while this directionality may be simulated by way of virtual sound propagation similar to that performed for sourced sounds in certain implementations, other implementations may not perform virtual sound propagation for environmental sounds 608. Rather, static environmental sound components may be mixed with dynamically propagating sourced sound components in a manner that provides the immersive audible qualities described herein while efficiently avoiding the processing work of continuously simulating propagation of the environmental sounds (e.g., a continuously flowing river or crackling fire, etc.).

As shown, different environmental sounds 608 may be associated with each sound zone 316 (i.e., environmental sound 608-1 for sound zone 316-1 and environmental sound 608-2 for sound zone 316-2 in this example). In this way, the audible ambiance presented to the user may be appropriate for the scene associated with a given sound zone, as described above. However, as has been mentioned and as will be described in more detail below, a mix of two or more environmental sounds 608 may be presented when an experience location is located in a transition zone 318 (i.e., located in more than one sound zone 316).

As used herein, "sound" generally refers to real or virtual acoustic energy that propagates through a medium (e.g., real or virtual air at a particular scene) from a sound source to a location where the sound can be perceived (e.g., an avatar), while "audio" generally refers to data or signals representative of such sound. For example, a binaural audio stream is a data stream that includes data for rendering two separate (but related) streams of sound that can be presented to each ear of a user (e.g., by way of stereo headphones or other suitable loudspeakers included in a device 302). Keeping this distinction in mind, certain numerical conventions are used herein to indicate a relation between certain sounds and certain audio data.

For example, FIG. 6B shows an illustrative mixing of audio components including a sourced audio component 606, an environmental audio component 608, and one or more other audio components 610 to form, by way of a mixing process 612, a binaural audio stream 614 composed specifically of a left audio stream 614-L (to be presented to a left ear of user 310) and a right audio stream 614-R (to be presented to a right ear of user 310). In this example, sourced audio component 606 uses the same number as sourced sounds 606 to indicate that this audio component corresponds to (e.g., includes data representative of) sourced sounds 606. Similarly, environmental audio component 608 uses the same number as environmental sounds 608 to indicate that this audio component corresponds to environmental sounds 608. For example, when the experience location 312 is located in sound zone 316-1 (as shown in FIG. 6A), sourced audio component 606 may represent sourced sound 606-1 but not sourced sound 606-2 (since sourced sound 606-2 is only present in sound zone 316-2) and environmental audio component 608 may represent environmental sound 608-1 but not environmental sound 608-2 (since environmental sound 608-2 is only present in sound zone 316-2). Other audio components 610 may also be mixed together with audio components 606 and 608 for presentation to the user as part of binaural audio stream 614. These other audio components 610 are not explicitly represented in FIG. 6A, but will be understood to represent any suitable sounds as may serve a particular implementation (e.g., a voice of a narrator, audible instructions, etc., that may be presented to the user but are not necessarily meant to be perceived as originating from anywhere associated with multizone augmented reality space 314).

In certain examples, each of the various sounds and audio streams represented in each of the audio components shown in FIG. 6B may be represented in three dimensions to capture a fully immersive way that real sound would propagate through a 3D space. Specifically, for example, a first environmental audio stream for environmental sound 608-1, a second environmental audio stream for environmental sound 608-2, sourced audio streams for sourced sounds 606, and binaural audio stream 614 may each be implemented as 3D audio streams (e.g., Ambisonic audio streams or audio streams using other suitable 3D audio formats) configured to recreate a sensation of sound arriving at two ears of a listener after propagating through a 3D space. Accordingly, mixing process 612 may be configured to combine audio components 606-610 in a manner that preserves 3D characteristics of the audio components (i.e., the audio stream or streams making up each of the audio components) so as to ultimately produce binaural audio stream 614 as a 3D audio stream that recreates the immersive experience of hearing sound in a 3D environment.

FIG. 6B shows a mixing process 612 by way of which distinct audio components (e.g., audio components 606-610) are combined to form a binaural audio stream 614 customized to a particular pose selected by a user (e.g., an experience location 312 and corresponding experience orientation, as described above). While not shown explicitly in FIG. 6B, it will also be understood that one or more sounds represented in one or more audio streams may similarly be mixed or combined to form each of audio components 606-610. For example, environmental audio component 608 may represent environmental sound 608-1 exclusively while experience location 312 is located in sound zone 316-1 and not sound zone 316-2 and may represent environmental sound 608-2 exclusively while experience location 312 is located in sound zone 316-2 and not sound zone 316-1. However, while experience location 312 is located in both sound zones 316-1 and 316-2 (i.e., by being located in transition zone 318-1-2), environmental audio component 608 may represent a mix of both environmental sounds 608-1 and 608-2 by combining respective environmental audio streams corresponding to these sounds.

To illustrate how this combining may be implemented in one example, FIG. 7 shows illustrative gain values assigned to different environmental audio streams included within an environmental audio component such as environmental audio component 608. More particularly, FIG. 7 shows a maximum gain value 702 and a minimum gain value 704 along a vertical axis while showing different experience locations 312 (e.g., an experience location 312-1 in sound zone 316-1, an experience location 312-2 in transition zone 318-1-2, and an experience location 312-3 in sound zone 316-2) along a horizontal axis. Two environmental audio streams labeled with the same numbers as environmental sounds in FIG. 6A are represented with bold lines in FIG. 7 that indicate the gain of each environmental audio stream as it is mixed into environmental audio component 608 for use in the mixing of FIG. 6B.

Specifically, as shown in FIG. 7, an environmental audio stream representing environmental sound 608-1 is represented with a bold line labeled 608-1 (referred to hereafter as "environmental audio stream 608-1"). This environmental audio stream 608-1 is shown to be mixed into environmental audio component 608 with a maximum gain value 702 as long as experience location 312 is only in sound zone 316-1 (e.g., as illustrated by experience location 312-1) and to be mixed into environmental audio component 608 with a minimum gain value 704 as long as experience location 312 is only in sound zone 316-2 (e.g., as illustrated by experience location 312-3). Similarly, an environmental audio stream representing environmental sound 608-2 is represented with another bold line in FIG. 7 (labeled 608-2 and hereafter referred to as "environmental audio stream 608-2"). This environmental audio stream 608-2 is shown to be mixed into environmental audio component 608 with the minimum amount of gain 704 as long as experience location 312 is only in sound zone 316-1 (e.g., as illustrated by experience location 312-1) and to be mixed into environmental audio component 608 with the maximum amount of gain 702 as long as experience location 312 is only in sound zone 316-2 (e.g., as illustrated by experience location 312-3).

When experience location 312 is in transition zone 318-1-2 (i.e., located in the overlap of both sound zones 316-1 and 316-2), both environmental audio streams 608-1 and 608-2 are shown to be mixed into environmental audio component 608 with an amount of gain lower than maximum gain value 702 and higher than minimum gain value 704. For example, a crossfade may be implemented between environmental audio stream 608-1 and 608-2 as experience location 312 moves along path 402 from sound zone 316-1 through transition zone 318-1-2 and into sound zone 316-2. As shown, the respective gain values used for environmental audio streams 608-1 and 608-2 in transition zone 318-1-2 may be dependent on how close to the edges of each sound zone 316 the experience location is. As such, there is shown to be a smooth drop off and ramp up of the respective gain values as the experience location leaves sound zone 316-1 and enters sound zone 316-2.

While linear transitions are shown for both environmental audio streams in FIG. 7, it will be understood that different curves may be employed as may serve a particular implementation. For instance, if certain environmental audio streams are especially subtle, it may be appropriate for them to ramp up more quickly (e.g., using a sine-shaped or cosine-shaped curve, using an exponential or parabolic curve, etc.) and/or ramp down more slowly than the linear example shown in FIG. 7. As another example, if certain environmental sounds are especially prominent, it may be appropriate for them to ramp up more slowly as the experience location enters a sound zone and/or ramp down more quickly as the experience location leaves the sound zone (again using any shape of curve as may serve a particular implementation).

Rather than a time-based cross-fade known in various audio applications (e.g., music, etc.), system 100 may implement the cross-fade shown in FIG. 7 as a location-based cross-fade that is dependent not on time, but on the current position of experience location 312. To implement a location-based cross-fade, system 100 may determine a first distance from experience location 312 to a boundary of sound zone 316-1, determine a second distance from experience location 312 to a boundary of sound zone 316-2, and generate, based on the first and second distances, a mix of environmental audio streams 608-1 and 608-2 to implement environmental audio component 608 of binaural audio stream 614. For example, at the position of experience location 312-2 (right in the middle of transition zone 318-1-2), environmental audio component 608 would have a mix in which environmental audio streams 608-1 and 608-2 each have an equal amount of gain (i.e., so as to be mixed evenly). However, at other positions within transition zone 318-1-2 such as a position closer to sound zone 316-1 (i.e., farther from the outer boundary of sound zone 316-1 and closer to the outer boundary of sound zone 316-2), environmental audio component 608 may be mixed to give one environmental audio stream more gain than the other (e.g., to give environmental audio stream 608-1 a higher amount of gain than environmental audio stream 608-2).

In this way, environmental audio component 608 may be continuously updated as user 310 moves experience location 312 to different locations within multizone augmented reality space 314. For example, for the particular path 402 shown in FIG. 7, system 100 may first detect experience location 312-1 and mix environmental audio component 608 to include only environmental audio stream 608-1 (or, more particularly, to mix environmental audio stream 608-1 at maximum gain value 702 and environmental audio stream 608-2 at minimum gain value 704, which may or may not completely remove environmental audio stream 608-2 from the overall mix). Thereafter, system 100 may detect movement to experience location 312-2 and mix environmental audio component 608 to include both environmental audio streams 608-1 and 608-2 at the gains shown. Subsequently, system 100 may detect that the experience location has moved again within multizone augmented reality space 314 to be located within only sound zone 316-2 and not sound zone 316-1 (e.g., moved to experience location 312-3), and, based on this detection, may update environmental audio component 608 to be implemented by environmental audio stream 608-2 and not environmental audio stream 608-1.

Figure 8:
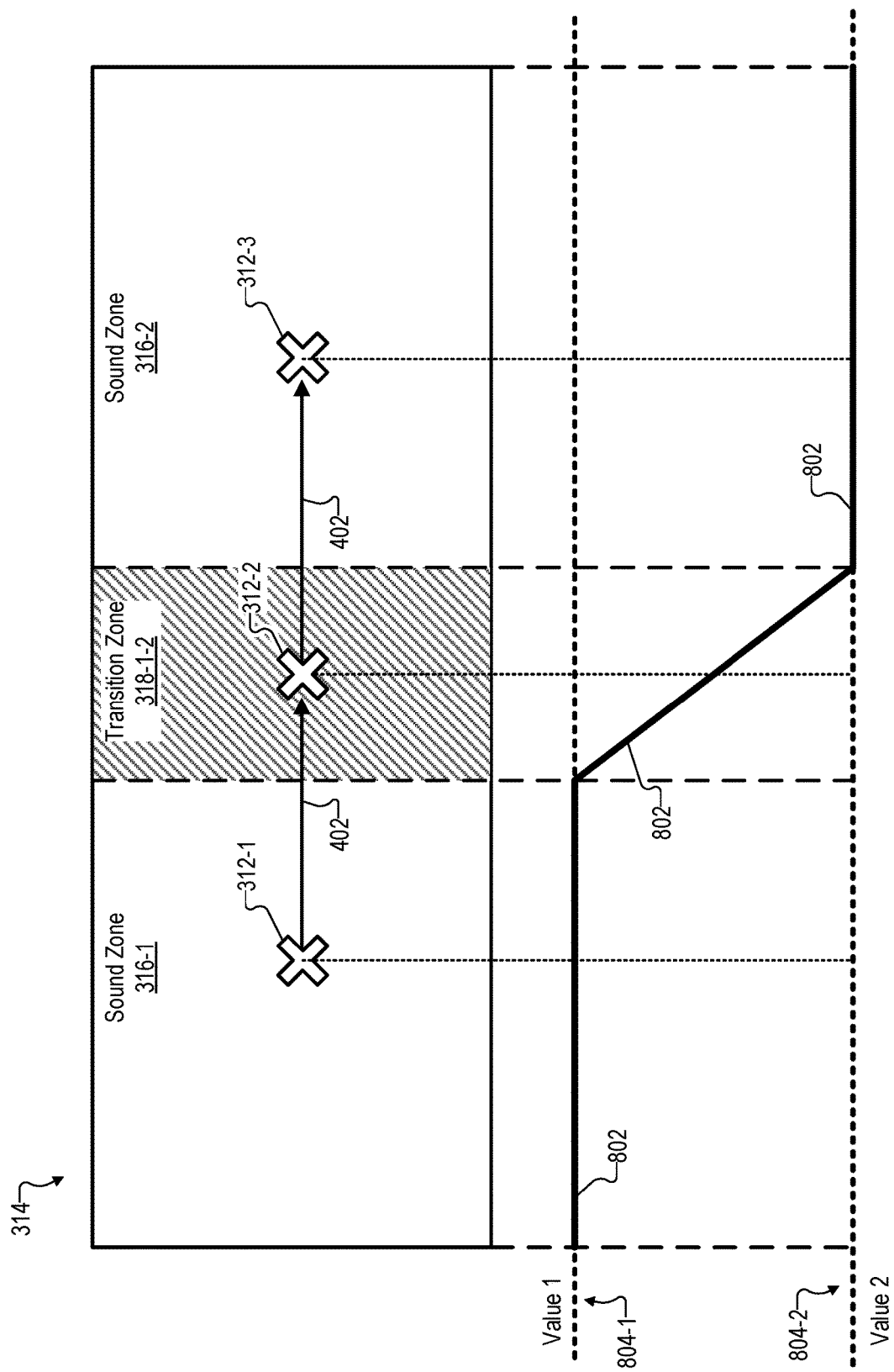
FIG. 8 shows illustrative acoustic parameter values assigned, with respect to different experience locations within a multizone augmented reality space, to an acoustic parameter used for simulating virtual sound propagation in accordance with principles described herein.

As shown in FIG. 8, system 100 may also perform a similar location-based fading from one sound zone to another for acoustic properties simulated for sourced sounds 606 and/or environmental sounds 608 virtually propagating through the multizone augmented reality space. Specifically, FIG. 8 shows an acoustic parameter 802 (represented as a bold line) that is assigned different values 804 (e.g., a value 804-1 labeled as Value 1, a value 804-2 labeled as Value 2, and various values between Value 1 and Value 2) with respect to different experience locations 312 within multizone augmented reality space 314 (e.g., including the same experience locations 312-1 through 312-3 along path 402 shown in FIG. 7).

As described above and illustrated above in relation to FIGS. 6A and 6B, system 100 may simulate virtual propagation of a virtual sound 606 (e.g., virtual sound 606-1 originating from the sound source at symbol 604-1, virtual sound 606-2 originating from the sound source at symbol 604-2, etc.) from a sound source to an experience location, and binaural audio stream 614 may then be generated to further include (mixed together with environmental audio component 608 and based on the simulating of the virtual propagation) a sourced audio component 606 representative of these sourced sounds. To realistically simulate the virtual propagation of virtual sounds within multizone augmented reality space 314, different sound zones may be simulated to have different acoustic characteristics or attributes. For example, the nature of different zones (e.g., whether they are indoors or outdoors, in a small room or a large room, etc.), the virtual materials present in different zones (e.g., materials that scatter sound, materials that absorb sound, materials that reflect sound, etc.), and other acoustic properties of different zones may all be represented by a set of acoustic parameters. It will be understood that the acoustic characteristics and attributes of a given sound zone may similarly affect environmental sounds 608 in the same way as described for sourced sounds 606 in certain examples.

As one example, an illustrative set of acoustic parameters characterizing a particular sound zone may include a density parameter, a diffusion parameter, a gain parameter, a decay time parameter, an echo time parameter, and/or any other parameters as may serve a particular implementation. Different values for these types of parameters may then be assigned for different sound zones to dictate various aspects of virtual sound propagation within the sound zones. A first set of acoustic parameter values associated with sound zone 316-1 may be used to simulate propagation of virtual sound (e.g., sourced sound 606-1) when experience location 312 is in sound zone 316-1 and not sound zone 316-2. A second set of acoustic parameter values associated with sound zone 316-2 may be used to simulate virtual propagation of virtual sounds (e.g., sourced sound 606-2) when experience location 312 is in sound zone 316-2 and not sound zone 316-1. Similarly, if system 100 determines that experience location 312 is within both sound zones 316-1 and 316-2 (i.e., by being in transition zone 318-1-2), the simulating of the propagation of the virtual sound may be performed based on a transition set of acoustic parameter values derived from both the first set of acoustic parameter values associated with the first sound zone and the second set of acoustic parameter values associated with the second sound zone.

Acoustic parameter 802 in FIG. 8 illustrates an example of a single acoustic parameter from such a set of acoustic parameters, and values 804-1 and 804-2 illustrate examples of different values that may be assigned to this acoustic parameter for different sound zones. As shown, as long as experience location 312 is only in sound zone 316-1 (e.g., as illustrated by experience location 312-1), Value 1 may be used for acoustic parameter 802. Similarly, as long as experience location 312 is only in sound zone 316-2 (e.g., as illustrated by experience location 312-3), Value 2 may be used for acoustic parameter 802. However, when experience location 312 is in transition zone 318-1-2 (as is the case for experience location 312-2 in FIG. 8), a value 804 between Value 1 and Value 2 may be assigned based on the distance from the boundaries of each sound zone 316 in a similar way as described above for the drop-off/ramp-up of environmental audio stream gain in FIG. 7. Here again, as described in those gain examples, it will be understood that the transition from one acoustic parameter value to another may be linear (as shown in FIG. 8) or may have another shape such as a sinusoidal shape, an exponential shape, a parabolic shape, or the like.

It will be understood that acoustic parameter values may be arbitrarily assigned to create an immersive but imaginary soundscape (e.g., for a relatively small multizone augmented reality space example such as multizone augmented reality space 314-1 described above in FIG. 4), or may derive from real-world acoustics of a real-world scene (e.g., for a relatively large multizone augmented reality space example such as multizone augmented reality space 314-2 described above in relation to FIG. 5). For example, for a multizone augmented reality space 314-1 such as illustrated in FIG. 4, the first set, second set, and transition set of acoustic parameter values (e.g., including a value for acoustic parameter 802) may be configured to correspond to artificial acoustic properties that are designated for the multizone augmented reality space 314-1 and are different from real-world acoustic properties inherent to the multizone augmented reality space (which may be more or less uniform for the case of a tabletop physical model or the like such as described above). In contrast, for a multizone augmented reality space 314-2 such as illustrated in FIG. 5, the first set, second set, and transition set of acoustic parameter values (e.g., including a value for acoustic parameter 802) may be configured to correspond to real-world acoustic properties inherent to the multizone augmented reality space (which may be unique from room to room for the case of a multi-room structure or the like such as described above).

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
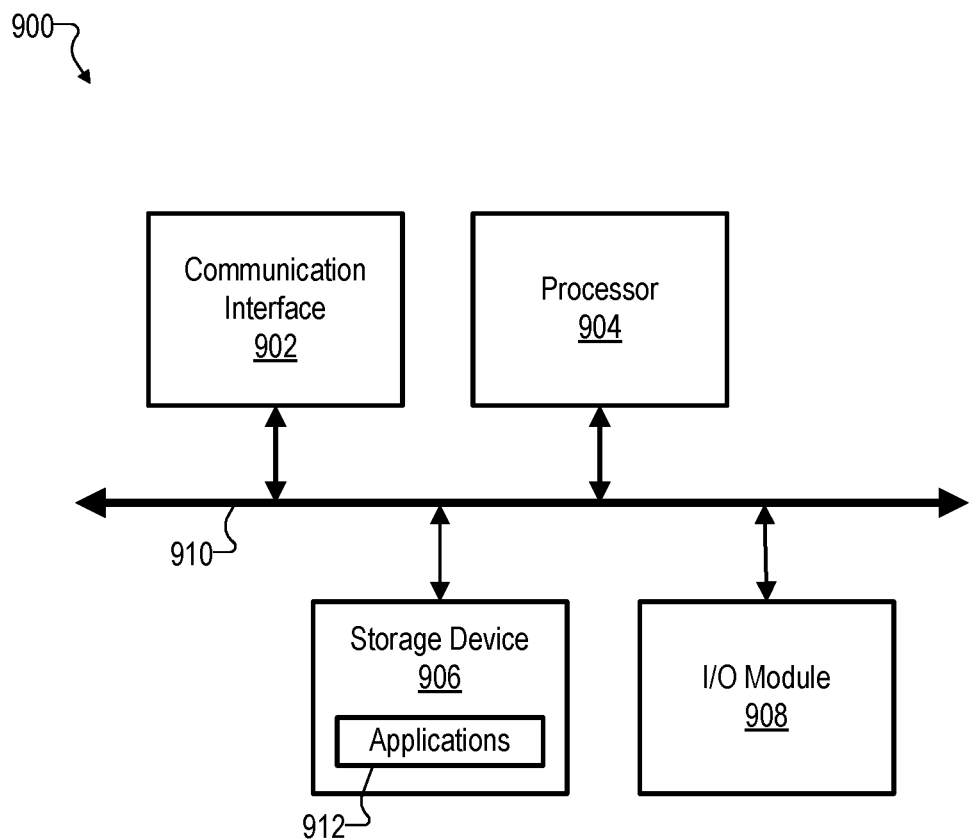
FIG. 9 shows an illustrative computing device that may implement audio processing systems and/or other systems and devices described herein in accordance with principles described herein.

FIG. 9 shows an illustrative computing device 900 that may implement audio processing systems and/or other systems and devices described herein in accordance with principles described herein. For example, computing device 900 may include or implement (or partially implement) an audio processing system such as system 100 or any component included therein or any system associated therewith (e.g., augmented reality presentation device 302, augmented reality provider system 304, MEC system 306, elements of network 308, etc.).

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
   identifying, by an audio processing system, an experience location with which an augmented reality presentation device is associated, the experience location included within a multizone augmented reality space that is presented by the augmented reality presentation device;
   determining, by the audio processing system, that the experience location is within both a first sound zone and a second sound zone of the multizone augmented reality space; and
   generating, by the audio processing system and based on the determining that the experience location is within both the first and second sound zones, a binaural audio stream for presentation by the augmented reality presentation device, the binaural audio stream including an environmental audio component implemented by a mix of a first environmental audio stream associated with the first sound zone and a second environmental audio stream associated with the second sound zone.

2. The method of claim 1, wherein the experience location with which the augmented reality presentation device is associated is a location of the augmented reality presentation device within the multizone augmented reality space.

3. The method of claim 1, wherein the experience location with which the augmented reality presentation device is associated is a location, within the multizone augmented reality space, that is displayed within a field of view presented by the augmented reality presentation device.

4. The method of claim 1, further comprising, at a time subsequent to when the experience location is determined to be both within the first and second sound zones:
   detecting, by the audio processing system, that the experience location has moved within the multizone augmented reality space to be located within only the second sound zone and not the first sound zone; and
   updating, by the audio processing system and based on the detecting that the experience location has moved to be located within only the second sound zone, the environmental audio component included in the binaural audio stream to be implemented by the second environmental audio stream and not the first environmental audio stream.

5. The method of claim 1, further comprising:
   determining, by the audio processing system, a first distance from the identified experience location to a boundary of the first sound zone;
   determining, by the audio processing system, a second distance from the identified experience location to a boundary of the second sound zone; and
   generating, by the audio processing system and based on the first and second distances, the mix of the first and second environmental audio streams implementing the environmental audio component of the binaural audio stream.

6. The method of claim 1, wherein:
   a sound source present within the multizone augmented reality space originates a virtual sound;
   the method further comprises simulating, by the audio processing system and within the multizone augmented reality space, virtual propagation of the virtual sound from the sound source to the experience location; and
   the binaural audio stream is generated to further include, mixed with the environmental audio component and based on the simulating of the virtual propagation, a sourced audio component representing the virtual sound.

7. The method of claim 6, wherein, based on the determining that the experience location is within both the first and second sound zones, the simulating of the virtual propagation of the virtual sound is performed based on a transition set of acoustic parameter values derived from:
   a first set of acoustic parameter values associated with the first sound zone, and
   a second set of acoustic parameter values associated with the second sound zone.

8. The method of claim 7, wherein the first set, second set, and transition set of acoustic parameter values are configured to correspond to artificial acoustic properties that are designated for the multizone augmented reality space and are different from real-world acoustic properties inherent to the multizone augmented reality space.

9. The method of claim 7, wherein the first set, second set, and transition set of acoustic parameter values are configured to correspond to real-world acoustic properties inherent to the multizone augmented reality space.

10. The method of claim 1, wherein each of the first environmental audio stream, the second environmental audio stream, and the binaural audio stream are implemented as three-dimensional (3D) audio streams configured to recreate a sensation of sound arriving at two ears of a listener after propagating through a 3D space.

11. A system comprising:
   a memory storing instructions; and
   a processor communicatively coupled to the memory and configured to execute the instructions to:

identify an experience location with which an augmented reality presentation device is associated, the experience location included within a multizone augmented reality space that is presented by the augmented reality presentation device;
determine that the experience location is within both a first sound zone and a second sound zone of the multizone augmented reality space; and
generate, based on the determining that the experience location is within both the first and second sound zones, a binaural audio stream for presentation by the augmented reality presentation device, the binaural audio stream including an environmental audio component implemented by a mix of a first environmental audio stream associated with the first sound zone and a second environmental audio stream associated with the second sound zone.

12. The system of claim 11, wherein the experience location with which the augmented reality presentation device is associated is a location of the augmented reality presentation device within the multizone augmented reality space.

13. The system of claim 11, wherein the experience location with which the augmented reality presentation device is associated is a location, within the multizone augmented reality space, that is displayed within a field of view presented by the augmented reality presentation device.

14. The system of claim 11, wherein the processor is further configured to execute the instructions, at a time subsequent to when the experience location is determined to be both within the first and second sound zones, to:
detect that the experience location has moved within the multizone augmented reality space to be located within only the second sound zone and not the first sound zone; and
update, based on the detecting that the experience location has moved to be located within only the second sound zone, the environmental audio component included in the binaural audio stream to be implemented by the second environmental audio stream and not the first environmental audio stream.

15. The system of claim 11, wherein the processor is further configured to execute the instructions to:
determine a first distance from the identified experience location to a boundary of the first sound zone;
determine a second distance from the identified experience location to a boundary of the second sound zone; and
generate, based on the first and second distances, the mix of the first and second environmental audio streams implementing the environmental audio component of the binaural audio stream.

16. The system of claim 11, wherein:
a sound source present within the multizone augmented reality space originates a virtual sound;
the processor is further configured to execute the instructions to simulate, within the multizone augmented reality space, virtual propagation of the virtual sound from the sound source to the experience location; and
the binaural audio stream is generated to further include, mixed with the environmental audio component and based on the simulating of the virtual propagation, a sourced audio component representing the virtual sound.

17. The system of claim 16, wherein, based on the determining that the experience location is within both the first and second sound zones, the simulating of the virtual propagation of the virtual sound is performed based on a transition set of acoustic parameter values derived from:
a first set of acoustic parameter values associated with the first sound zone, and
a second set of acoustic parameter values associated with the second sound zone.

18. The system of claim 17, wherein the first set, second set, and transition set of acoustic parameter values are configured to correspond to artificial acoustic properties that are designated for the multizone augmented reality space and are different from real-world acoustic properties inherent to the multizone augmented reality space.

19. The system of claim 17, wherein the first set, second set, and transition set of acoustic parameter values are configured to correspond to real-world acoustic properties inherent to the multizone augmented reality space.

20. A non-transitory computer-readable medium storing instructions that, when executed, direct a processor of a computing device to:
identify an experience location with which an augmented reality presentation device is associated, the experience location included within a multizone augmented reality space that is presented by the augmented reality presentation device;
determine that the experience location is within both a first sound zone and a second sound zone of the multizone augmented reality space; and
generate, based on the determining that the experience location is within both the first and second sound zones, a binaural audio stream for presentation by the augmented reality presentation device, the binaural audio stream including an environmental audio component implemented by a mix of a first environmental audio stream associated with the first sound zone and a second environmental audio stream associated with the second sound zone.

* * * * *